May 8, 1951 N. I. KORMAN 2,552,437

SPIRAL SWEEP CIRCUIT

Filed Feb. 27, 1948 2 Sheets-Sheet 1

INVENTOR
NATHANIEL I. KORMAN
BY Morris L. Rabin
ATTORNEY

May 8, 1951 N. I. KORMAN 2,552,437

SPIRAL SWEEP CIRCUIT

Filed Feb. 27, 1948 2 Sheets-Sheet 2

INVENTOR
NATHANIEL I. KORMAN
BY Morris Kahn
ATTORNEY

Patented May 8, 1951 2,552,437

UNITED STATES PATENT OFFICE 2,552,437

SPIRAL SWEEP CIRCUIT

Nathaniel I. Korman, Merchantville, N. J., assignor to Radio Corporation of America, a corporation of Delaware Application February 27, 1948, Serial No. 11,589

6 Claims. (Cl. 315—24)

This invention relates to spiral sweep circuits for cathode-ray tubes, for example, storage type tubes, and, more particularly, to means for improving the linearity of spiral sweep circuits.

The storage tube is a device for storing electrical signals. The type which is referred to in the present specification is a cathode-ray tube having the requirement that the electron beam is required to trace a spiral on the screen of the tube. A practical manner of accomplishing the spiral sweep is by shock-exciting two tuned circuits in such a way that a cosine and a sine wave are created which normally decay exponentially when the shocking impulse is removed. These two waves are applied, respectively, to the horizontal and vertical deflecting coils or plates of the tube in order to produce the desired spiral.

Since the exponential function is normally such that it decreases more rapidly at first and more slowly later, the loops of the spiral are not evenly spaced and the screen of the tube is not utilized most efficiently.

The principal object of the present invention is to provide means for generating a spiral sweep having uniformly spaced loops.

Another object of the invention is to provide means for utilizing more efficiently the screen of a cathode ray tube which may be a storage type tube.

Another object of the invention is to provide means for linearizing the amplitude decay in a shock-excited circuit normally having exponential decay.

Figure 1:
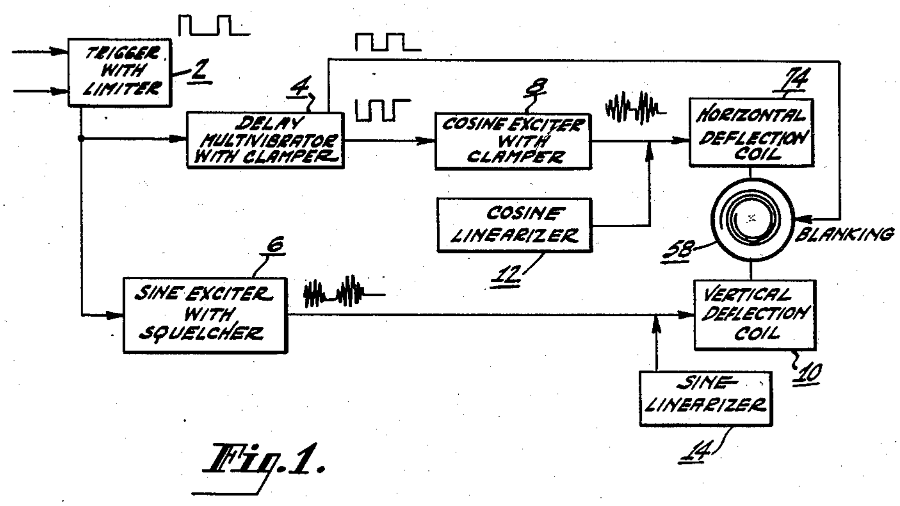
Figure 2:
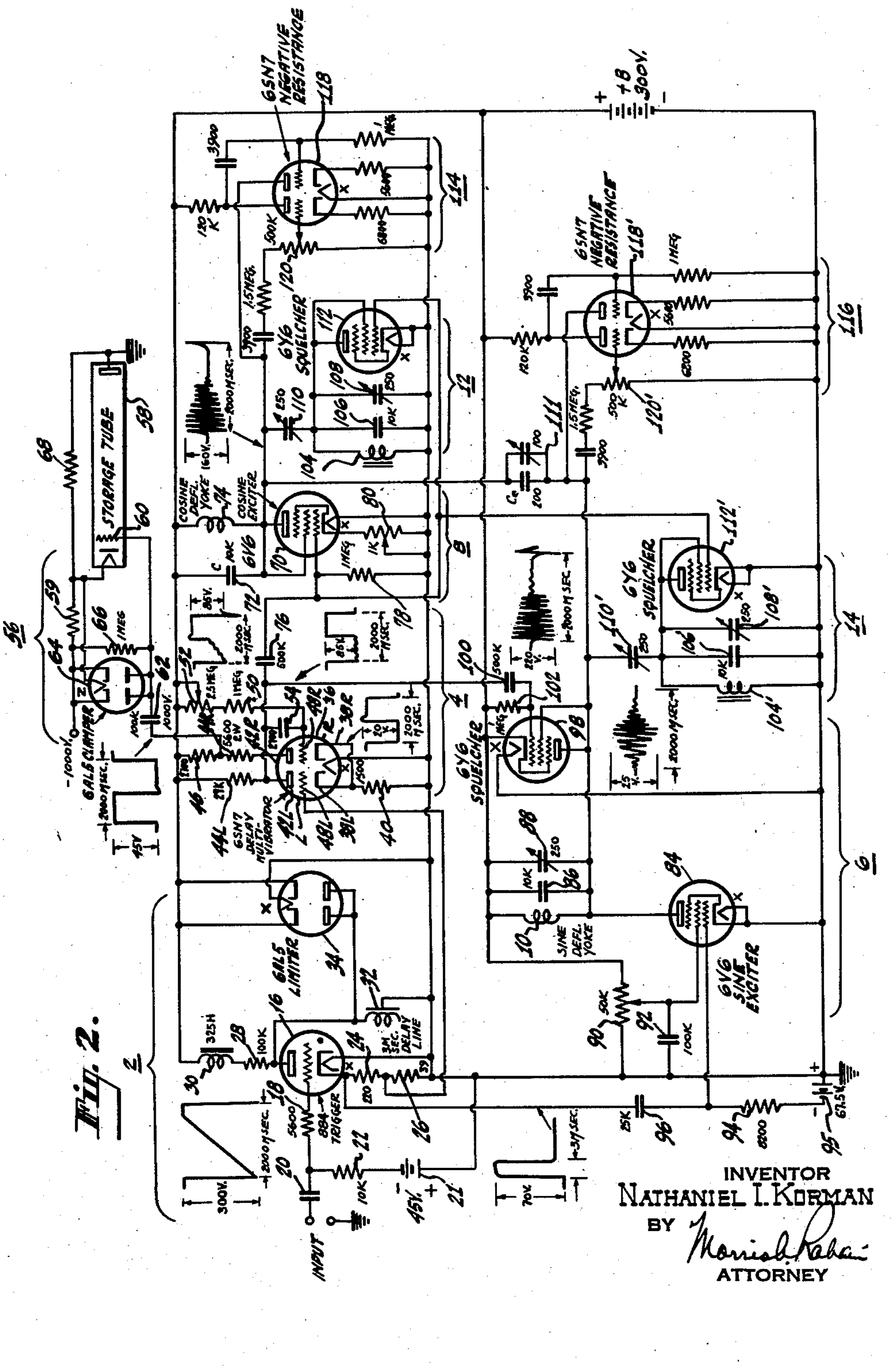

These and other objects will be more apparent and the invention will be better understood from the following specification, including the drawings, of which:

Figure 1 is a block diagram of one form of circuit in which the circuit of the present invention may be utilized, and Figure 2 is a schematic diagram of the circuit of Figure 1.

The spiral pattern which it is desired to obtain on the storage tube mosaic is one which begins at the outside and winds inward. To obtain this pattern with magnetic deflection, a decaying sine wave of current is required in each of the deflection coils at the same frequency but displaced 90 degrees in time phase. One of these waves is chosen to begin at zero current and will be referred to as the sine deflection current, while the other begins at maximum current and will be referred to as the cosine deflection current. The decaying wave forms are generated in the deflection coils by tuning each to the same frequency with parallel capacitors.

The time between successive initiations of the wave train is divided into two parts: the "on" time when the several turns of the spiral appear on the mosaic and the "off" time when the beam is blanked off. During the "off" time, the exciter stages are acted upon to restore them to the steady state conditions to allow the spiral sweep to again be generated.

The general form and mode of operation of a system in which the linearizing circuits of the present invention may be included will now be explained with reference to the block diagram of Figure 1.

Pulses of energy are received from a transmitter (not shown) which may be a radar transmitter. These are received by the trigger stage 2 which includes a limiter. The function of the trigger stage is to produce a pulse of a few microseconds, say three microseconds, duration with a steep leading side that occurs at almost the same instant as the beginning of the transmitter pulse and whose amplitude is independent of the transmitter pulse.

A thyratron is used as the trigger tube with sufficient fixed bias to allow the tube to deionize itself. Upon applying the transmitter pulse to the grid of the thyratron, the tube almost instantly conducts.

The pulse from the thyratron in turn is applied to both a delay multivibrator 4 and a sine exciter stage 6. A dual triode is used as the delay multivibrator and produces two individual output signals, one a negative gate and the other a positive gate, each starting at the same instant as the start of the three microsecond pulse delivered by the trigger tube. The duration of the gate is to be used as the "on" time while the remaining time is the "off" time.

Blanking is obtained by capacitively coupling the positive gate of the delay multivibrator to the grid of the storage tube. The grid is then clamped. The operation of the blanking is such that the positive portion of the gate is held at a fixed bias potential. The negative portion of the gate then drives the grid more negative and the beam is cut off.

The cosine exciter stage 8 is an amplifier stage driven by the negative gate of the delay multivibrator to cut off the current flow in the horizontal deflection coil.

The sine exciter stage 6 is an amplifier to apply the pulse from the trigger stage 2 to the tuned vertical deflection coil 10 of the storage tube.

Identical linearizing stages 12 and 14 for the horizontal and vertical deflection circuits, respectively, are required for the two deflection circuits. Each linearizing circuit tends to draw an increasing amount of energy from the deflection circuit with time thus decreasing the amplitudes of the successive cycles of the wave train below that of exponential decay so as to produce a more linear decay. This improved linearity occurs for a limited period of time after which the oscillations die away in a decaying sine wave envelope. The cathode ray tube, however, is operated only during the portion of the period when the decay is linear.

One modification of the linearizing circuits of the present invention will now be explained in connection with a particular form of spiral sweep circuit as shown in Fig. 2.

As in Fig. 1, the trigger stage is indicated generally at 2. To the grid of a thyratron tube 16, a resistor 18 and a blocking capacitor 20 are connected in series. Another resistor 22 has one end connected to a point between the resistor 18 and the capacitor 20 and has its other end connected to a source of negative biassing voltage 21. Two cathode load resistors 24 and 26 are connected from the cathode of the thyratron to ground. In the anode circuit of this tube are included an anode resistor 28 and an inductance 30. Also connected between the anode of the thyratron and ground is a three microsecond delay line 32. In parallel with the series connected anode resistor 28 and inductance 30 is a double diode tube 34 serving as a limiter.

The function of the blocking capacitor 20 in the grid circuit of the tube 16 is to differentiate the impulse received from the transmitter. For example, if the impulse is a square wave, the leading edge will be differentiated. The grid resistor 18 is of such a value that it prevents excessive grid current during the time the thyratron is discharging. The resistor 22 provides a relatively high impedance for the grid circuit.

In operation, the thyratron trigger tube is provided with sufficient fixed bias to allow the tube to deionize itself. The output voltage is taken from the cathode resistor. When the trigger stage is idle, the thyratron is deionized, the cathode is at zero potential, and the plate voltage rests at B+. Upon applying the transmitter pulse to the grid of the thyratron, the tube almost instantly conducts, the plate voltage dropping to approximately one-half the B+ voltage. This drop in plate voltage is maintained for approximately three microseconds by the delay line capacitance 32 and then the anode rapidly drops to approximately zero potential, thus deionizing the thyratron. During this time, the desired pulse is produced across the cathode resistors 24 and 26.

After the thyratron deionizes, the voltage on the anode gradually rises as the delay line capacitance becomes charged through the plate inductance 30 and resistor 28. The inductance 30 in the anode circuit aids in building up a charge in the delay line rapidly. The anode voltage tends to rise above the B+ potential, but is limited by the limiting diode 34 between the thyratron anode and B+. This limiting diode prevents any variation in amplitude of the thyratron output pulse when the transmitter pulse repetition rate varies.

The thyratron output pulses are fed to a multivibrator stage, indicated generally at 4. The multivibrator comprises a dual triode 36 having two identical sets of elements L and R. Both cathodes 38L and 38R are provided with a common cathode resistor 40. The left hand anode 42L is provided with a resistor 44L and the right hand anode 42R is provided with resistors 44R and 46. The left hand grid 48L is connected between the cathode load resistors 24 and 26 of the thyratron triggering tube 16. The right hand grid 48R is provided with a fixed resistor 50 and a variable resistance 52 which are returned to B+. A coupling capacitor 54 is connected between the left hand anode 42L and the right hand grid 48R.

The delay multivibrator produces two individual output signals, one a negative gate from anode 42L and the other a positive gate from anode 42R, each starting at the same instant as the start of the three microsecond pulse delivered by the trigger tube 16.

With no input signal to the multivibrator, the left hand side L is non-conducting and the right hand side R is conducting. The side R is conducting because the grid resistors 50 and 52 return to B+. The grid current, however, is very small because the total resistance of resistors 50 and 52 is very large, and the grid potential is essentially at cathode potential. The current through the common cathode resistor 40 provides sufficient cathode bias to prevent current flow in the left hand side L.

When the positive pulse is applied to the left hand grid 48L, the left hand side L conducts, increasing the cathode bias and decreasing its anode voltage. The rapid drop in anode voltage is coupled through the capacitor 54 to the right hand grid 48R causing a sequence of events. The plate current of 42R decreases, the bias decreases, the anode current of 42L increases, the anode voltage of 42L decreases, the right hand grid 48R becomes still more negative, etc., until the right side R is completely cut off and the left hand side L is drawing a steady current.

Thus far in the cycle, the right hand anode 42R has rapidly increased to B+ at the instant of applying the input pulse. This condition remains unchanged until the negative voltage on the right hand grid 48R decreases sufficiently to allow the right side R to conduct. Again, a regenerative condition occurs when the current in R increases the cathode bias, in turn decreasing the current in L, increasing the left hand anode voltage, making the right hand grid more positive through capacitor 54, increasing current in R, decreasing right hand anode voltage, etc., until now left hand side L is non-conducting and right hand side R is conducting.

The conditions have now been returned to the steady state and ready for the next input pulse to repeat the cycle.

It is seen that the negative gate at the left hand anode 42L and the positive gate at the right hand anode 42R start at the beginning of the input pluse and are maintained for a time dependent upon the time of discharge of the capacitor 54. This discharge time may, in turn, be varied by varying the resistor 52.

The duration of the gate is to be used as the "on" time while the remaining time is the "off" time.

Associated with the delay multivibrator stage is the grid circuit 56 of the storage tube 58. Normal operating bias on the storage tube 58 is developed across the resistor 59. The storage tube 58 is blanked by coupling its grid 60 through a capacitor 62 to the positive gate of the multivibrator. In the embodiment illustrated, this involves connecting one side of the capacitor between the resistors 44R and 46 in the anode circuit of the side R of the delay multivibrator tube. The grid 60 is then clamped by connecting a double diode 64 and parallel resistor 66 from the grid to its bias voltage. The anodes of the diode are connected to the grid of the storage tube. A dropping resistor 68 is also connected between the anode and cathode of storage tube 58 to provide sufficient high voltage between the two elements.

The operation of the blanking is such that the diode holds the positive portion of the gate at the fixed bias potential developed across resistor 59. The negative portion of the gate then drives the grid more negative in amount equal to the amplitude of the gate and the beam is cut off.

The cosine exciter stage is indicated generally at 8. It is an amplifier stage driven by the negative gate of the delay multivibrator to cut off the current flow in the horizontal deflection coil. This stage includes a pentode 70 operated as a triode. The screen grid and anode of tube 70 are connected together and in turn are connected to the cosine deflection yoke 74. The other side of the yoke is connected to B+. The capacitor 72 is connected across the cosine deflection yoke which controls the horizontal deflection of the electron beam in the storage tube 58. A coupling capacitor 76 is connected between the control grid of tube 70 and left hand anode 426 of the double triode 36. Connected between the control grid of tube 70 and ground is a fixed resistor 78. A variable resistor 80 is connected between the cathode of tube 70 and ground. The amount of current flowing in the anode circuit of the tube 70 depends upon the resistance of the variable resistor 80; hence, this element serves as the gain control for the cosine deflection circuit.

The value of the coupling capacitor 76 is preferably sufficiently large to maintain the square wave shape on the exciter grid. The positive pulse of the gate is clamped to ground by the grid-cathode circuit of the squelcher tubes 112 and 112'. During the positive pulse, the cosine exciter draws a constant plate current through the deflection coil 74.

Upon application of the negative pulse, the cosine exciter is cut off and remains cut off during the entire negative pulse. The shock of rapidly cutting off the coil current initiates the oscillations in the tuned circuit comprising tuned coil 74 and capacitor 72.

Application of the positive pulse occurs at the same time the storage tube is blanked off and at this time the exciter tube 70 conducts, acting to quickly squelch the coil oscillations and again establish the constant current through the coil. The variable cathode resistor 80 controls the magnitude of exciter current and thus the size of the spiral for the horizontal direction.

The sine exciter stage with its squelcher is indicated generally at 6. As stated previously, this is an amplifier to apply the pulse from the trigger stage to the tuned vertical deflection yoke coil 10 of the storage tube. It includes a pentode tube 84 to the anode of which is connected an oscillatory circuit consisting of the yoke coil inductance 10 in parallel with a fixed capacitor 86 and a variable tuning capacitor 88. To the screen grid of the pentode are connected a variable resistor 90 and a capacitor 92 in parallel. The control grid is connected through resistor 94 to a source of negative voltage 95 and through a blocking capacitor 96 to the cathode of the thyratron trigger tube 16. Also connected across the tuned yoke coil 10 is a pentode 98, operated as a triode and acting as a squelching tube. The cathode of tube 98 is connected to B+ and the anode and screen grid of the tube are connected to the anode of tube 84. This squelching tube has its control grid capacitively connected to the negative side (i. e., the left hand anode 42L of dual triode 36) of the delay multivibrator by means of the capacitor 100. This control grid is also connected to B+ through a resistor 102.

The pulse from the trigger stage, upon being applied to the tuned yoke coil 10 starts an oscillation which starts with a maximum voltage across and a minimum current through the coil. The bias on the tube 84 is sufficiently high to cut off the tube completely at all times except during the duration of the pulse so that the tube has no effect of damping the oscillations of the tuned yoke coil. The variable screen voltage due to variable resistor 90 is used to control the magnitude of the applied pulse and thus the size of the spiral for the vertical component.

The squelching tube 98 quenches the oscillations during the "off" time, leaving the tuned yoke coil ready for the next pulse. This squelching tube is conducting during the "off" period and cut off during the "on" period.

Identical linearizing stages 12 and 14 which are a particular feature of the present invention are required for each of the two deflection circuits. Each of these stages comprises a high Q tuned circuit consisting of an induction coil 104 or 104', a fixed capacitor 106 or 106' and a tuning capacitor 108 or 108'. These tuned circuits are loosely coupled to their respective deflection yoke coils 74 and 10 by the variable capacitors 110 and 110'. Each linearizing circuit is resonated at the same frequency as its tuned yoke coil. Each linearizing circuit tends to draw an increasing amount of energy from the deflection circuit with time thus decreasing the amplitudes of the successive cycles of the wave train below that of exponential decay so as to produce a linear decay.

As a further feature of each linearizing circuit, each is preferably but not necessarily provided with a pentode 112 and 112' connected across the circuit in parallel with the induction coil and capacitors. These pentodes are also operated as triodes. The control grid of each of these tubes 112 and 112' is connected to the control grid of the cosine exciter tube 70. The function of the tubes 112 and 112' is to squelch or suppress the waves that are present during the "off" time and leave these circuits ready for the next wave train. The action of the negative gate of the delay multivibrator cuts off the squelchers during the gate's negative pulse and conducts during the gate's positive pulse.

The linearizing is adjusted by increasing the coupling capacitor 110 or 110' just sufficiently to have the pattern essentially linearized. The tuning capacitor must be varied as the coupling is varied in order to maintain linearization.

The shape of the spiral pattern is normally affected by coupling between the yoke coils. To eliminate interaction due to this cause, the leads from the yoke are connected with such polarity as to have a minimum reaction and then the residual capacity may be neutralized with a dual capacitor 111 connected between the two coils.

In order to raise the effective Q of the yokes, it is preferable, although not absolutely necessary, to utilize negative resistance circuits such as are indicated generally at 114 and 116. Each of these stages may consist of a dual triode two-stage amplifier 118 or 118' with its output connected back to its input. Each of these stages 114 and 116 is effectively connected across its deflection yoke coil 74 or 10, respectively. The dual triodes 118 or 118' are also each provided with a potentiometer 120 or 120' as a gain adjustment and this element controls the degree of negative resistance reflected to the deflection yoke coils.

There has thus been described a spiral sweep circuit including an improved circuit for linearizing the pattern obtained on the screen of the storage tube. The spiral sweep pattern is round and appears on the mosaic concentric with the point at which the non-deflected beam appears. The shape of the pattern is not affected upon varying its size and the spacing between the successive turns of the spiral are essentially equal. Moreover, the pattern is not affected by a large variation of the input pulse width. It should be noted that the negative resistance stages may be omitted if the Q of the deflection yoke coils is sufficiently high. It will also be apparent that electrostatic deflection means can be substituted for the electromagnetic deflection yoke coils utilized for deflecting the electron beam and that similar substitutions can also be made in various parts of the circuit embodiment illustrated without departing from the spirit of the invention.

I claim as my invention:

1. A circuit for producing a spiral electron beam trace on the screen of a cathode ray tube comprising separate deflection means for deflecting the electron beam of said tube in two different planes angularly displaced from each other, tuned circuits for controlling each of said deflection means, means for generating a normally exponentially decaying sine wave of current in each of said tuned circuits, said waves being of the same frequency but displaced 90 degrees in phase, and linearizing means associated with each of said deflection means, each of said linearizing means being arranged to draw an increasing amount of energy from its deflection means with time such that substantially linear decay is produced.

2. A circuit according to claim 1 in which each of said deflection means comprises a tuned yoke coil and each of said linearizing means comprises a tuned circuit coupled to one of said yoke coils and is resonated at the same frequency as said coil.

3. A circuit according to claim 2 in which said linearizing circuits are alternately in an "on" and "off" condition and include a squelching tube for suppressing the waves present during the "off" time.

4. A circuit according to claim 1 in which each of said linearizing means comprises a tuned circuit coupled to said deflection means.

5. A circuit for producing a spiral electron beam trace having evenly spaced loops on the screen of a cathode ray tube comprising separate deflection means for deflecting the electron beam of said tube in two different planes at right angles to each other, tuned circuits for controlling each of said deflection means, means for shock exciting said tuned circuits such that spaced successive normally exponentially decaying sine waves of current are produced in each of said tuned circuits, said waves being of the same frequency but displaced 90 degrees in phase, and linearizing means associated with each of said deflection means, each of said linearizing means being arranged to draw an increasing amount of energy from its deflection means with time such that substantially linear decay is produced.

6. A circuit for producing a spiral electron beam trace having evenly spaced loops on the screen of a cathode ray tube comprising means for successively generating and cutting off the electron beam of said tube during regularly spaced time intervals, means for deflecting the electron beam of said tube in two different planes at right angles to each other, tuned circuits for controlling each of said deflection means, means for shock exciting said tuned circuits such that successive normally exponentially decaying sine waves of current are produced in each of said tuned circuits during periods corresponding to the periods during which said electron beam is being generated, said waves being of the same frequency but displaced 90 degrees in phase, and linearizing means associated with each of said deflection means, each of said linearizing means being arranged to draw an increasing amount of energy from its deflection means with time such that substantially linear decay is produced.

NATHANIEL I. KORMAN.

REFERENCES CITED

The following references are of record in the file of this patent:

UNITED STATES PATENTS

| Number | Name | Date |
|---|---|---|
| 1,470,696 | Nicolson | Oct. 16, 1923 |
| 2,307,237 | Rea et al. | Jan. 5, 1943 |
| 2,408,414 | Donaldson | Oct. 1, 1946 |
| 2,408,415 | Donaldson | Oct. 1, 1946 |
| 2,411,572 | Hershberger | Nov. 26, 1946 |
| 2,449,792 | Snyder Jr. | Sept. 21, 1948 |